Dec. 30, 1969   J. J. C. VANDERSTEEN   3,486,414
GROOVE CUTTING APPARATUS FOR AN INTERNAL BEARING SURFACE
Filed June 16, 1967

INVENTOR.
JACOBUS J.C. VANDERSTEEN
BY
AGENT

United States Patent Office 3,486,414
Patented Dec. 30, 1969

3,486,414
GROOVE CUTTING APPARATUS FOR AN
INTERNAL BEARING SURFACE
Jacobus Johannes Cornelius Vandersteen, Emmasingel,
Eindhoven, Netherlands, assignor, by mesne assignments, to U.S. Philips Corporation, New York, N.Y.,
a corporation of Delaware
Filed June 16, 1967, Ser. No. 646,647
Claims priority, application Netherlands, Apr. 14, 1967,
6609413
Int. Cl. B23c 3/28; B23g 1/00, 5/16
U.S. Cl. 90—11.54                              8 Claims

ABSTRACT OF THE DISCLOSURE

An apparatus for machining grooves in the bore of a bearing member. A spindle having a tool holder including a plurality of radially outwardly acting cutters attached to resilient tongues extending from the tool holder is translationally and rotatably mounted in a support. A rod having an enlarged diametral portion adjacent one end passes through the center of the tool holder. The enlarged diametral portion provides a support for the cutters and also provides a precise dimensional control for determining the depth of grooves to be machined in the bore of the bearing member.

---

Figure 1:
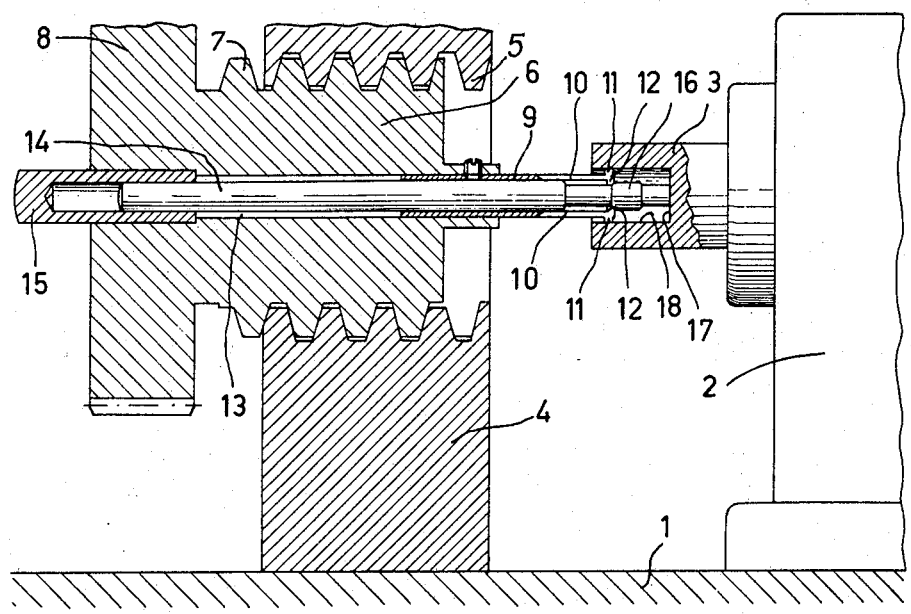

The invention relates to an apparatus for machining shallow helical grooves in a rotation-symmetrical recess of a bearing member by means of a cutting tool, including a rotatable spindle and a clamping member on which the cutting tool and the bearing member can be secured. The spindle and the clamping member are adapted to perform a relative rotary and translational movement wherein the cutting tool cuts one or more helical grooves in the surface of the recess of the bearing member.

It is known that bearings in which one of the relatively cooperating surfaces is provided with very shallow, helical or spiral-like grooves have a particularly effective hydrodynamic lubricating capacity and have a high loading power. Such bearings, whose lubricating medium may consist of grease, oil or air, are called spiral-groove bearings. In these bearings the lubricant is pumped into the bearing by the grooves when one of the bearing members is rotating. This action produces a high pressure in the lubricant. Spiral-groove bearings are constructed inter alia in the form of a grooved shaft in a cylindrical bearing member and of a conical grooved stub, adapted to rotate in a conical bearing cup. Making grooves on a shaft involves difficulties due to the requirements for accuracy. For mass production of the grooves in the usually stationary, recessed bearing member hitherto no satisfying solution has been found. Yet it is advantageous to make the grooves in the recess of a stationary bearing member. The stationary bearing member is usually made of a material which is less hard than that of the shaft, so that the cutting tool will not wear as rapidly. Moreover, the risk of damage of the groove pattern in the recess in transport and mounting is less great than with a groove pattern on the shaft. It is possible to make helical groves in a cylindrical recess by means of a conventional lathe. However, craftsmanship is required to accurately machine the groove to the correct depth, especially since for optimum hydrodynamic operation of the bearing shallow grooves are required. With typical bearing sizes groove depths ranging $20\mu$ to $50\mu$ are normal. If, in addition, a multi-track helical groove has to be made, which is frequently desired, the difficulties in manufacture cannot practically be overcome. This latter method of processing takes much labor and is not suitable for mass production.

An object of the invention is to provide an apparatus for machining the grooves in a bore of a spiral-groove bearing member at low cost and in a manner suitable for mass production.

According to the invention, an apparatus for machining shallow grooves in the bore of a bearing member is provided. The apparatus includes a tool holder having at least one resilient tongue on which a cutter is mounted. A pin-shaped body having an enlarged diametral portion adjacent one end of the rod is located within the tool holder. The surface of the enlarged portion is in contact with the cutter during relative axial movement between the holder and the pin. That is, each resilient tongue with its cutter will override the enlarged diametral portion thus urging the cutter into the wall surface of the bearing bore which is to be machined. The cutter of each tongue cuts a helical groove of a depth determined by the radial dimension of the portion in the bore of the bearing member. The accuracy of machining of the grooves depends only upon the precision with which the tongues of the tool holder and the enlarged portion of the pin are fabricated. Skill is not required for operating the device. If the tool holder comprises a plurality of resilient tongues, each having a cutter thereon, a multi-track groove can be machined in a single operation.

Figure 2:
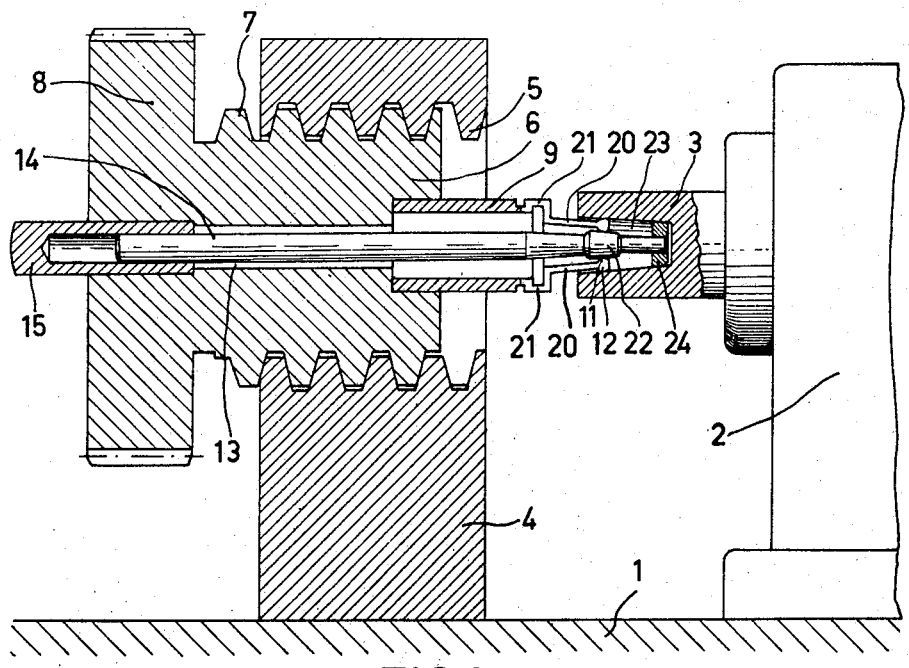

The invention will be described more fully with reference to the preferred embodiments thereof shown in the drawing, in which:

FIG. 1 is a sectional view of part of a device according to the invention for making helical grooves in the cylindrical recess of a bearing member, and FIG. 2 shows a similar device for making grooves in the conical recess of a bearing member.

The device shown diagrammatically in FIG. 1 comprises a frame 1, having a clamping head 2 for a bearing member 3. The frame 1 has a stationary support 4, in which a screwthread 5 is formed. A screw spindle 6 having a threaded cylindrical portion 7, engages the thread 5. The screw spindle 6 also includes a gear 8, which engages a gear (not shown) of a driving mechanism for the screw spindle. A tubular tool holder 9 is secured to the spindle 6. As shown on the righthand side in FIG. 1 the tool holder 9 has four sawcuts, so that four resilient tongues 10 are formed. Each of the resilient tongues 10 is provided with a cutter 11 having an inner shoulder 12. A rod 14 is slidingly supported by support 15 in the bore 13 of spindle 6. The rod 14 has a portion 16 of enlarged diameter. This diametral portion is precisely dimensioned.

The above described cutter apparatus cuts grooves in the bearing member 3 in the manner hereinafter described. A bearing member 3 having a cylindrical recess 18 with a bottom 17 is fastened in the clamping head 2. The bearing member 3 may advantageously be made of a sintered metal. The screw spindle 6 is moved towards the bearing member 3, when the gear wheel 8 is driven, so that the resilient tongues 10 exert pressure by shoulders 12 on the shoulder of the enlarged diametral portion 16 of the rod 14 thus moving the rod into the recess 18 until the end of the rod 14 strikes the bottom 17. The portion 16 is then accurately positioned adjacent the area of surface 18 at which the helical grooves are to be cut. The cutters 11 are still out of contact with the wall surface defining the cylindrical recess 18. FIG. 1 shows this position. The screw spindle and the tool holder are then moved inwardly towards the bottom 17 so that the shoulders 12 of the resilient tongues 10 are spread in a radial direction by the enlarged portion 16. The depth of penetration of the cutters 11 into the surface of the recess 18 is very accurately determined by the diameter of the enlarged portion 16. This depth will be very small in the case of helical-groove bearings. A hole having a diameter of about 6 mm. will have a groove in the order of 20µ. The helices of the screw threads 5 and 7 determine the pitch of the grooves in the recess formed by each of the cutters 11. When the shoulders 12 arrive at the end of the enlarged portion 16, the tongues 10 spring radially inwardly so that the cutters 11 are out of contact with the surface of the bearing member 3. When the gear 8 is driven in the opposite direction, the tool holder moves to the left in FIG. 1, so that the shoulders 12 of the tongues 10 exert pressure on the shoulder of the enlarged portion 16 of the rod 14, thus moving the pin 14 out of the recess 18. This completes the four-track groove machining operation. After the cutters have been relocated on the left side of the enlarged portion 16 as shown in FIG. 1, the apparatus is ready for machining another bearing.

FIG. 2 shows an apparatus operating in a manner similar to that of FIG. 1. The apparatus shown in FIG. 2 is for machining grooves in a conical recess. The resilient tongues 20 of the tool holder 9 are conical and the transitional portion 21 between the shank of the tool holder and the tongues 20 has the form of a bridge. The resilient tongues 20 are again obtained by sawcuts in the tool holder. These sawcuts extend into the bridge-shaped transition 21. The tongues thus provide a satisfactory spring force, so that they are not likely to break down in the case of a slightly larger spread. The enlarged diametral portion 22 of the rod 14 in this embodiment has the shape of a cone. The device operates in a similar manner as described with reference to FIG. 1. The axial disposition of the thickened portion 22 in the conical recess 23 of the bearing member 3 is, however, obtained in a different manner. The rod 14 is provided with a ring 24, having a conical outer face. This ring strikes the wall surface of recess 23 when the thickened portion 22 is adjacent the position where the grooves are to be machined.

The number of resilient tongues of the tool holder corresponds with the number of helical tracks desired to be machined in the recess of the bearing member. When viewed in cross-section, the resilient tongues form a regular polygon, the center of which coincides with the center line of the rotatable spindle.

The material of the recessed bearing member is not subjected to severe requirements. It has been found that in the case of a sintered metal, for example, the grooves can be made very accurately, while the bearing exhibits an effective hydrodynamic lubrication.

FIGS. 1 and 2 illustrate only two possible embodiments of the device according to the invention. It will be obvious that the means for producing the relative rotary and translational movements of the tool holder 9 and the bearing member 3 may be constructed otherwise than by the screw spindle shown in FIGS. 1 and 2. The tool holder may, for example, be stationary, whereas the bearing member is moved by rotation and translation. Moreover, the place of the thickened portion 16, 22 in the recess of the bearing member 3 may be adjusted in a different way, for example, by means of an adjustable fastening of rod 14 to the frame 1. The resilient tongues 10, 20 may be made as separate parts and be secured to the shank of the tool holder. The recess in which the grooves have to be made need not be provided with a bottom; for example, one or more groove patterns may be provided at the desired places in the inner surface of a hollow cylinder.

What is claimed is:

1. An apparatus for cutting grooves in the annular bore of a bearing member comprising: a support; a rotatable and translatable spindle means having a central axis mounted in said support; a slideable rod engaging said spindle having a central axis coincident with said spindle axis, said rod having a diametrically enlarged portion adjacent one end thereof; a tool holder connected at one end to said spindle for rotational and translational movement therewith, said tool holder being concentric to said rod, said spindle and said tool holder being movable with respect to said rod; an elongated resilient tongue means formed as an integral part of the tool holder and having a free end overlying said rod, said resilient tongue means being parallel to the axis of said rod; a cutter element attached to the free end of said resilient tongue means, said cutter element being positioned adjacent said rod and adapted to slide over said diametrically enlarged rod portion by the radial flexing of the resilient tongue means to provide a radially directed cutter when said spindle and said tool holder are translationally and rotatably moved relative to said rod.

2. An apparatus for cutting grooves in the annular bore of a bearing member according to claim 1 wherein said diametrically enlarged portion is cylindrical in shape.

3. An apparatus for cutting grooves in the annular bore of a bearing member according to claim 1 wherein said diametrically enlarged rod portion is frusto-conical in shape.

4. An apparatus for cutting grooves in the annular bore of a bearing member according to claim 1 wherein said elongated resilient tongue means comprises a plurality of tongue elements concentrically positioned around said rod.

5. An apparatus for cutting grooves in the annular bore of a bearing member according to claim 1 wherein said elongated resilient tongue means comprises a plurality of tongue elements attached to said tool holder and positioned around said rod, and said diametrically enlarged rod portion is frusto-conical, with said resilient tongue means being inclined inwardly at an angle substantially equal to one half the cone angle whereby translational and rotational movement of said cutters to said resilient tongue elements over said frusto-conical portion provides a cutter apparatus adapted to machine grooves in the surface of a bore of frusto-conical shape.

6. An apparatus for cutting grooves in the annular bore of a bearing member according to claim 1 wherein said rotatable and translational spindle includes a gear having an externally threaded cylindrical section adjacent thereto, said gear and said threaded cylindrical section having a bore therethrough coincident with the central axis of said threaded cylindrical section and said gear; and said support includes a threaded bore engaging the thread of said cylindrical section.

7. An apparatus for cutting grooves in the annular bore of a bearing member according to claim 6 wherein said elongated resilient tongue means comprises a plurality of tongue elements concentrically positioned around said rod and said diametrically enlarged section of said rod is substantially cylindrical.

8. An apparatus for cutting grooves in the annular bore of a bearing member according to claim 6 wherein said elongated resilient tongue means comprises a plurality of tongue elements attached to said tool holder and positioned around said rod, and said diametrically enlarged rod portion is frusto-conical, with said resilient tongue means being inclined inwardly at angle substantially equal to one half the cone angle whereby translational and rotational movement of said cutters attached to said resilient tongue elements over said frusto-conical portion provides a cutter adapted to machine grooves in the surface of a bore of frusto-conical shape.

References Cited

UNITED STATES PATENTS

| | | | |
|---|---|---|---|
| 509,878 | 12/1893 | Curtis | 10—101 |
| 1,674,863 | 6/1928 | Jennings | 77—58.32 |
| 2,054,029 | 9/1936 | Benninghoff | 10—145 |
| 2,314,084 | 3/1943 | Fried | 77—58.41 |
| 2,544,444 | 3/1951 | Clark | 77—58.32 |
| 2,799,872 | 7/1957 | Krahnke | 10—138 |
| 3,193,859 | 7/1965 | Pfister | 10—138 |
| 1,100,984 | 6/1914 | Murchey | 77—58.32 |

FOREIGN PATENTS 554,160   6/1943   Great Britain.

GERALD A. DOST, Primary Examiner

U.S. Cl. X.R.

10—138, 145; 77—57

UNITED STATES PATENT OFFICE
CERTIFICATE OF CORRECTION

Patent No. 3486414      Dated December 30, 1969

Inventor(s) JACOBUS JOHANNES CORNELIS VANDERSTEEN

It is certified that error appears in the above-identified patent and that said Letters Patent are hereby corrected as shown below:

Column 1, line 9, after "application Netherlands"

claims priority date should be

--July 6, 1966--

Signed and sealed this 12th day of May 1970

(SEAL)
Attest:

EDWARD M. FLETCHER, JR.      WILLIAM E. SCHUYLER, JR.
Attesting Officer      Commissioner of Patents